H. SHORROCKS.
MEANS FOR PRODUCING CINEMATOGRAPHIC PICTURES WITH STEREOSCOPIC EFFECTS.
APPLICATION FILED DEC. 5, 1918.

1,324,179.

Patented Dec. 9, 1919.
3 SHEETS—SHEET 1.

INVENTOR
H. Shorrocks.
BY H. R. Kerslake
ATTORNEY

H. SHORROCKS.
MEANS FOR PRODUCING CINEMATOGRAPHIC PICTURES WITH STEREOSCOPIC EFFECTS.
APPLICATION FILED DEC. 5, 1918.

1,324,179.
Patented Dec. 9, 1919.
3 SHEETS—SHEET 2.

INVENTOR
H. Shorrocks.
BY H. R. Kerslake
ATTORNEY

H. SHORROCKS.
MEANS FOR PRODUCING CINEMATOGRAPHIC PICTURES WITH STEREOSCOPIC EFFECTS.
APPLICATION FILED DEC. 5, 1918.
1,324,179.
Patented Dec. 9, 1919.
3 SHEETS—SHEET 3.
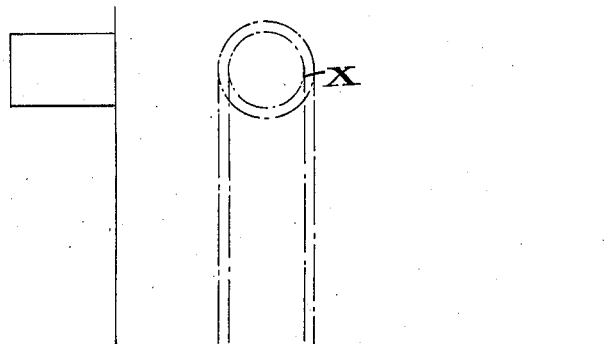
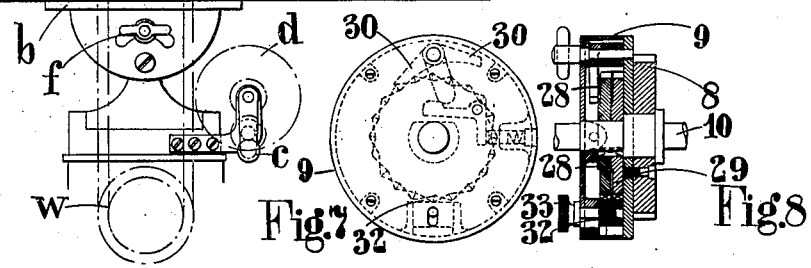
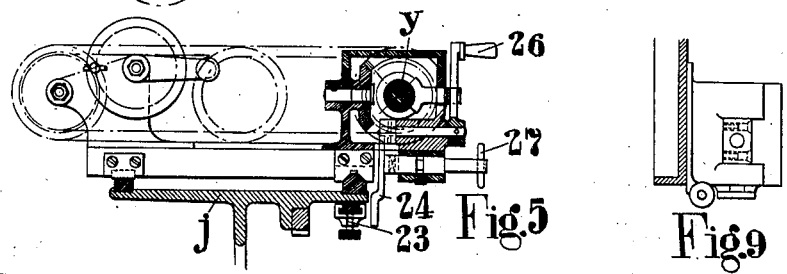
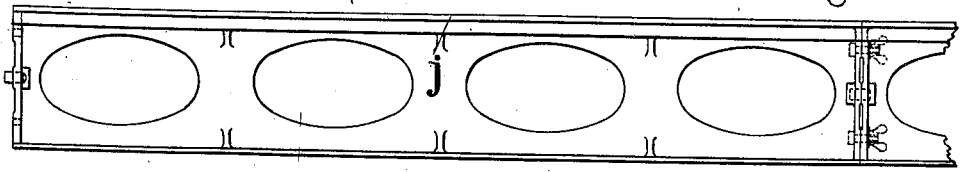
INVENTOR
H. Shorrocks.
BY L. R. Kerslake
ATTORNEY

UNITED STATES PATENT OFFICE.

HERBERT SHORROCKS, OF MANCHESTER, ENGLAND.

MEANS FOR PRODUCING CINEMATOGRAPHIC PICTURES WITH STEREOSCOPIC EFFECTS.

1,324,179. Specification of Letters Patent. Patented Dec. 9, 1919.

Application filed December 5, 1918. Serial No. 265,414.

*To all whom it may concern:*

Be it known that I, HERBERT SHORROCKS, a subject of the King of Great Britain and Ireland, and resident of 199 Brunswick street, Chorlton-on-Medlock, Manchester, in the county of Lancaster, England, have invented certain new and useful Improvements in Means for Producing Cinematographic Pictures with Stereoscopic Effects, of which the following is a specification.

This invention has for its object to provide for the production of cinematographic pictures showing stereoscopic effects. A further object of the invention is to provide for the simultaneous operation of the photographic film and shutter mechanism and of the mechanism whereby the stereoscopic effects are obtained.

In accordance with my invention, the camera is traversed in a straight line, and is also given an angular movement whereby it is maintained continually focused upon a principal object. The objects between the camera and the principal object will thus appear to be moving in one direction, the objects behind the principal object to be moving in the opposite direction and the principal object to be stationary or rotating. There are therefore three distinct picture systems and the one nearest the camera will stand out in relief or be sharply defined while owing to the persistence of the principal object in the camera field, it will have prominence given to it. A stereoscopic effect is thus imparted to the picture.

My invention comprises the improved combinations and arrangements of parts hereinafter described.

Referring to the accompanying explanatory drawings:—

Fig. 5 is a sectional end elevation on the line CD of Fig. 1.

Figs. 6 to 10 are detail views to be hereinafter referred to.

The same reference letters in the different views indicate the same parts.

Figure 2:
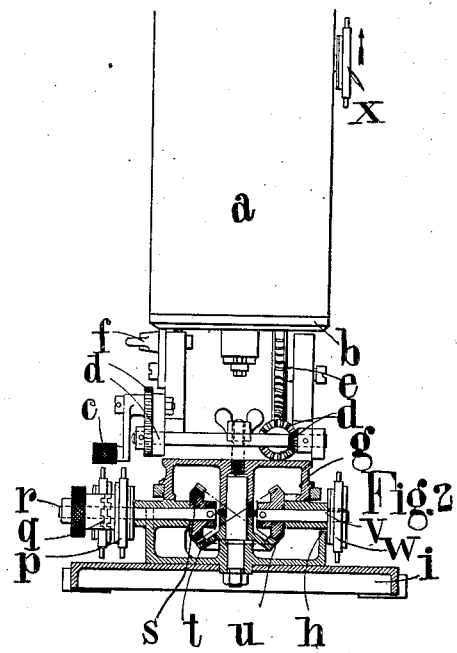
Fig. 2 is a sectional elevation on the line AB of Fig. 1, but with the camera in position.

The cinematographic camera $a$, Figs. 2 and 6, is mounted on a tilting table $b$ which can be set at any desired inclination by means of the handle $c$, gears $d$, and toothed sector $e$. It is locked in position by the winged nut $f$.

The tilting table $b$ is secured upon a rotatable table $g$ carried on a base $h$ fixed to a carriage $i$ which can be traversed along the slide or girder-like member $j$.

The whole of the movements required to traverse the camera on its supports along the slide $j$, to rotate the table $g$ so that during the longitudinal movement of the camera the latter remains continuously focused upon one principal object, and to operate the camera itself for taking the required photographs, are obtained from the one hand wheel $k$ by mechanism to be now described.

The actuation of the camera film and shutter mechanism is effected as follows:—The hand wheel $k$ drives the shaft $m$ through spur wheels $n$. Upon the shaft $m$ is keyed a sprocket wheel $o$ which drives, by means of a chain (not shown), the sprocket wheel $p$ which can be clutched by the clutch $q$ to the shaft $r$ carrying on its end the bevel wheel $s$ (Fig. 2) meshing with a bevel $t$ mounted upon the holding down bolt of the tilting table $b$ and the rotating table $g$. The bevel wheel $t$ rotates the bevel $u$ on the spindle $v$ carrying the sprocket wheel $w$, which by means of a chain (Fig. 6) drives the sprocket wheel $x$ actuating the camera shutter and film. The bevel wheel $u$ and its spindle $v$ are mounted on the rotatable camera support so that the sprocket wheel $w$ will always be in line with the sprocket wheel $x$.

The rotary motion of the camera which keeps its lens always centered about one principal object while the camera is being traversed longitudinally along the bed or slide $j$ is obtained as follows:—Upon the shaft $m$ is keyed the clutch part $y$ capable of being brought into engagement with either the bevel $z$ or the bevel 2 for driving a sleeve 3 carrying two sprocket wheels 4 and 5. The sprocket wheel 5 by means of a chain (not shown) drives a sprocket wheel 6 on a spindle carrying the spur wheel 7, the latter by means of the spur wheel 8, ratchet box 9 (to be hereinafter described) and shaft 10 rotating the worm 11 engaging the worm wheel 12 on the rotating table $g$.

Figure 3:
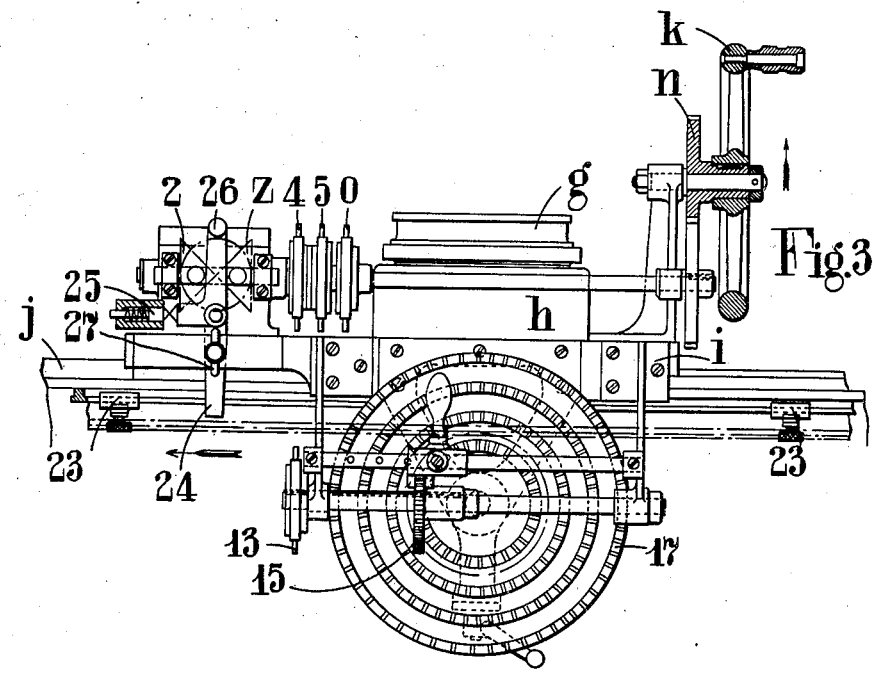
Fig. 3 is a front view of the mechanism shown in Fig. 1.
Figure 4:
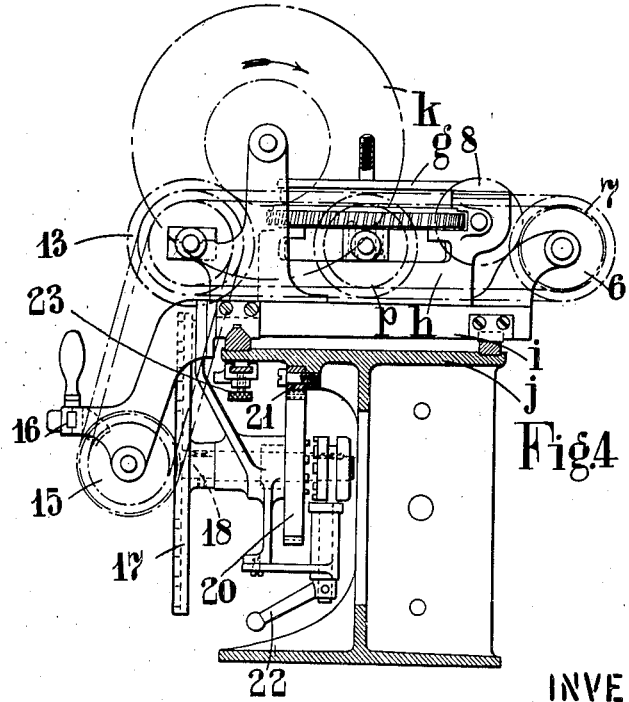
Fig. 4 is an end view.

The longitudinal motion of the machine is obtained from the sprocket wheel 4 through the sprocket wheel 13 on the shaft 14, on which is feather-keyed the pinion 15 adjustable on the shaft by the fork 16, and engaging one or other of the sets of teeth on the multiple gear wheel 17 (Figs. 3 and 4). The latter is keyed to the spindle 18 carrying the clutch 19 which engages the wheel 20 meshing with the rack 21 on the bed or slide $j$. The clutch 19 is controlled by the handle 22.

Reversal of the direction of the sprocket wheels 4 and 5 for returning the camera along the track $j$ and rotating it in the reverse direction is effected automatically by one or other of the adjustable stops 23 (see Fig. 3) on a bar on the bed striking the arm 24 and moving the clutch $y$ into engagement with one or other of the bevel wheels 2 and $z$. A spring pressed plunger 25 insures that the arm 24 moves from one extreme position to the other in a rapid manner. Hand operation of the clutch $y$ can be effected through the handle 26 on the lever 24. The latter may be locked in its mid position by means of a pin turned by its winged head 27. The multiple gear wheel 17 allows of a variation in the rate of traverse of the camera to be effected.

Figure 1:
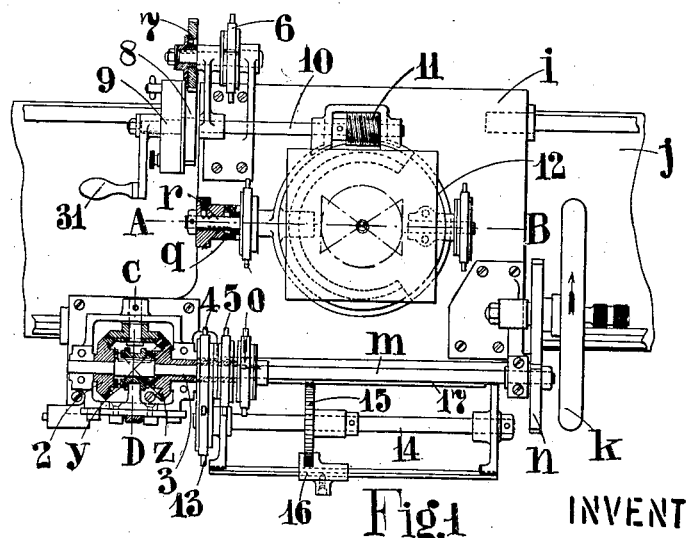
Figure 1 is a plan view partly in section of my improved mechanism.

The ratchet box 9, before referred to, contains right and left hand ratchet wheels 28 and 29, see Figs. 7 and 8, engaged by a double sided pawl 30 according to the direction of rotation. When one of the pawls is in gear, the shaft 10 may still be rotated by hand in advance of the pawl by means of the handle 31 (Fig. 1) or the pawl may be disengaged and the shaft 10 be rotated solely by the handle 31. When once the axial position of the camera has been set, having regard to its longitudinal position and the position of the object or scene being photographed, the ratchet wheels 28 and 29 may be locked to the ratchet box by the double toothed slide 32 with its locking stud 33.

The mechanism before described for giving the combined axial and longitudinal motion to the camera and for actuating the film and shutter mechanism of the latter may be varied to suit requirements.

The bed $j$ may be arranged in a horizontal or other plane according to requirements.

In place of the hand wheel $k$, the mechanism may be operated by power, and the part $i$ may be arranged to run on ball or roller bearings.

Having now described my invention what I claim as new and desire to secure by Letters Patent is:—

1. In means for the production of cinematographic pictures with stereoscopic effects, in combination, an immovable beam or slide, a non-rotatable carrier riding on said beam or slide, a camera support rotatable upon said carrier, and means for simultaneously traversing said carrier and rotating said support upon the carrier, as set forth.

2. In means for the production of cinematographic pictures with stereoscopic effects, in combination, a rotatable camera support, a beam or slide, a carrier for said support riding upon said beam or slide, means for simultaneously traversing said carrier, rotating said support and operating the camera, as set forth.

3. In means for the production of cinematographic pictures with stereoscopic effects, in combination, a rotatable camera support, a beam or slide, a carrier for said support riding upon said beam or slide, means for traversing the said carrier upon the beam or slide, means for rotating the camera support and automatic means for reversing the direction of traverse of the carrier and of rotation of the support, and means for simultaneously operating the camera, as set forth.

4. In means for the production of cinematographic pictures with stereoscopic effects, in combination, an inclinable table for the camera, a rotatable support for said table, a carrier for said support, a beam or slide upon which the carrier rides, means simultaneously traversing the carrier, rotating the support and operating the camera, means for automatically reversing the carrier and support, and means for the hand operation of the camera support, as set forth.

In testimony whereof I have signed my name to this specification.

HERBERT SHORROCKS.